US006993486B2

(12) United States Patent
Shimakawa

(10) Patent No.: US 6,993,486 B2
(45) Date of Patent: Jan. 31, 2006

(54) SPEECH COMMAND RECOGNITION APPARATUS, METHOD, AND STORAGE MEDIUM USED THEREWITH FOR CONTROLLING A PLURALITY OF ELECTRONIC DEVICES OVER A NETWORK

(75) Inventor: Masato Shimakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 09/834,504

(22) Filed: Apr. 13, 2001

(65) Prior Publication Data

US 2002/0013710 A1    Jan. 31, 2002

(30) Foreign Application Priority Data

Apr. 14, 2000  (JP)  ............................. 2000-112872

(51) Int. Cl.
 *G10L 21/00*  (2006.01)
(52) U.S. Cl. .................... 704/275; 704/270.1; 704/270
(58) Field of Classification Search ................ 704/275, 704/231, 270.1, 270, 271, 272, 251; 710/109
See application file for complete search history.

(56) References Cited

U.S. PATENT DOCUMENTS

| | | | | |
|---|---|---|---|---|
| 5,129,072 A | * | 7/1992 | Larner et al. .................. 710/48 |
| 5,375,063 A | * | 12/1994 | Peck et al. ................... 700/136 |
| 5,890,122 A | * | 3/1999 | Van Kleeck et al. ........ 704/275 |
| 6,052,666 A | * | 4/2000 | Diehl et al. .................. 704/275 |
| 6,219,645 B1 | * | 4/2001 | Byers .......................... 704/275 |
| 6,219,703 B1 | * | 4/2001 | Nguyen et al. ............. 709/224 |
| 6,230,137 B1 | * | 5/2001 | Has et al. .................... 704/275 |
| 6,240,347 B1 | * | 5/2001 | Everhart et al. ............... 701/36 |
| 6,308,157 B1 | * | 10/2001 | Vanbuskirk et al. ........ 704/275 |
| 6,345,245 B1 | * | 2/2002 | Sugiyama et al. ............ 704/10 |
| 6,535,854 B2 | * | 3/2003 | Buchner et al. ............. 704/275 |
| 6,584,439 B1 | * | 6/2003 | Geilhufe et al. ............ 704/275 |

* cited by examiner

*Primary Examiner*—W. R. Young
*Assistant Examiner*—James S. Wozniak
(74) *Attorney, Agent, or Firm*—Frommer Lawrence & Haug LLP; William S. Frommer; Thomas F. Presson

(57) ABSTRACT

In an information processing apparatus, a command definition management unit obtains command definition information, and based thereon, generates speech recognition dictionaries in an XML parser unit and a speech recognition dictionary unit. The speech recognition dictionaries are then stored in a command definition storage unit. With reference to the speech recognition dictionaries, a speech recognition management unit recognizes a speech command transmitted from an input unit, and outputs candidate control commands to a control command determination unit. The control command determination unit determines a control command corresponding to the speech command, with reference to a control command history storage unit as required, and outputs to an IEEE 1394 AV/C command conversion unit. The IEEE 1394 AV/C command conversion unit converts the control command into an AV/C command, and outputs to a target node.

21 Claims, 7 Drawing Sheets

FIG. 2

DVC

STATE 0

| SPEECH COMMAND | CONTROL COMMAND | TRANSITION |
|---|---|---|
| POWER ON | POWER ON | 1 |
| SWITCH ON | POWER ON | 1 |

STATE 1

| SPEECH COMMAND | CONTROL COMMAND | TRANSITION |
|---|---|---|
| POWER OFF | POWER OFF | 0 |
| SWITCH OFF | POWER OFF | 0 |
| PLAY | PLAY | 2 |

STATE 2

| SPEECH COMMAND | CONTROL COMMAND | TRANSITION |
|---|---|---|
| STOP | STOP | 1 |

- - - - - - -

STATE X

| SPEECH COMMAND | CONTROL COMMAND | TRANSITION |
|---|---|---|
| | | |
| | | |
| | | |

SPEECH COMMAND RECOGNITION APPARATUS, METHOD, AND STORAGE MEDIUM USED THEREWITH FOR CONTROLLING A PLURALITY OF ELECTRONIC DEVICES OVER A NETWORK

BACKGROUND OF THE INVENTION

1. Field of the Invention

The present invention relates to information processing involving the speech recognition technology. More specifically, the present invention relates to an information processing apparatus, an information processing method, and a storage medium storing a computer program for implementing the information processing apparatus and method, which allow a plurality of electronic apparatuses to be controlled in an integrated manner by a single speech recognition apparatus using an integrated user interface.

2. Description of the Related Art

Speech recognition technology is being more often incorporated in apparatuses for controlling electronic apparatuses. Such apparatuses recognize speech commands, i.e., words and phrases uttered by the user, and determine corresponding commands for controlling the electronic apparatuses.

By way of example, in a car navigation apparatus incorporating the speech recognition technology, when the user inputs, for example, "Shinjuku" as a speech command to a user interface device such as a microphone, the car navigation apparatus analyzes the speech command in an speech recognition apparatus incorporated therein, and thereby recognizes that the speech command indicates Shinjuku, the name of a particular are in Tokyo. Then, the car navigation apparatus, in accordance with a predetermined program, determines the best route from the current position to Shinjuku.

However, in the above case, each electronic apparatus includes a dedicated speech recognition apparatus which individually receives speech commands from the user. Thus, in order to control a plurality of electronic apparatuses using speech commands, the corresponding number of speech recognition apparatuses are required, which is often not feasible.

In order to solve the above problem, it has been proposed that the speech recognition apparatus be provided on a network. Still, according to the approach, each electronic apparatus must be individually provided with a user interface device such as a microphone, failing to achieve an integrated user interface.

Furthermore, in order to install new electronic apparatuses, new speech recognition apparatuses and user interface devices must also be provided correspondingly.

In addition, speech commands from the user are individually received in the respective speech recognition apparatuses incorporated in each of the electronic apparatuses, inhibiting integration of the user interface and integrated control of a plurality of electronic apparatuses.

SUMMARY OF THE INVENTION

Accordingly, it is an object of the present invention to provide a speech recognition apparatus for controlling a plurality of electronic apparatuses in an integrated manner using an integrated user interface.

To this end, the present invention, in one aspect thereof, provides an information processing apparatus for controlling, in accordance with speech commands input by the user, a plurality of electronic apparatuses on a network connected to the information processing apparatus. The information processing apparatus includes a command definition information obtaining unit for obtaining command definition information which defines the correspondence between a plurality of speech commands which are to be input by the user and a plurality of control commands for controlling the plurality of electronic apparatuses; a storage unit for storing the command definition information obtained by the command definition information obtaining unit; a speech recognition unit for recognizing a speech command input by the user; a determining unit for determining a control command corresponding to the speech command as recognized by the speech recognition unit, based on the command definition information stored in the storage unit; and a control unit for controlling one of the plurality of electronic apparatuses using the control command determined by the determining means.

In the information processing apparatus as defined above, the command definition information is preferably associated with ID information of the plurality of electronic apparatuses.

It is also preferable that the command definition information defines, on the basis of operation status of the plurality of electronic apparatuses, acceptable speech commands, control commands corresponding to the speech commands, and transitions of operation status which occur on execution of each of the control commands.

More preferably, the determining unit includes an operation status detecting unit for detecting the operation status of the plurality of electronic apparatuses, so that the determining unit determines, in accordance with the operation status of the plurality of electronic apparatuses detected by the operation status detecting unit, the control command corresponding to the speech command as recognized by the speech recognition unit, based on the command definition information.

The command definition information obtaining unit may obtain the command definition information from a server on the Internet or from a storage medium.

Preferably, the information processing apparatus further includes an ID information obtaining unit for obtaining ID information of the plurality of electronic apparatuses, so that the command definition information obtaining unit obtains the command definition information based on the ID information of the plurality of electronic apparatuses obtained by the ID information obtaining unit.

More preferably, the ID information includes at least one of node ID, product ID, machine ID, and type ID.

The node ID herein refers to an ID which identifies individual nodes on a network, the product ID refers to an ID which is assigned on a product basis, such as serial number, the machine ID refers to an ID which is assigned to a group of products having common functionality, such as machine type, and type ID refers to an ID which indicate the type of electronic apparatus, such as television receiver and video cassette recorder.

The command definition information obtaining unit may obtain the command definition information based on node ID, product ID, machine ID, or type ID, in that order of priority, included in the ID information of the plurality of electronic apparatuses obtained by the ID information obtaining unit.

It is also preferable that the information processing apparatus further includes a connection status detecting unit for detecting the connection status of the plurality of electronic apparatuses, so that the command definition information obtaining unit obtains and deletes the command definition information based on the connection status of the plurality of electronic apparatuses detected by the connection status detecting unit.

It is also preferable that the information processing apparatus further includes a selecting unit for allowing the user to select one of the plurality of electronic apparatuses, so that the determining unit is allowed to determine the control command corresponding to the speech command as recognized by the speech recognition unit, based on only part of the command definition information corresponding to the electronic apparatus selected by the selecting unit.

It is also preferable that the information processing apparatus further includes a control command history storage unit for storing history information regarding the control command determined by the determining means, so that an electronic apparatus in accordance with a user input or an electronic apparatus which is found to be most recently operated according to the history information stored in the control command history storage unit is controlled using the control command, if it is not otherwise determined which of the plurality of electronic apparatuses be controlled using the control command.

It is also preferable that the information processing apparatus further includes a command definition information generation unit for generating command definition information as desired, so that the command definition information obtaining unit is allowed to obtain the command definition information from the command definition information generation unit.

The present invention, in another aspect thereof, provides an information processing method in an information processing apparatus for controlling, in accordance with speech commands input by the user, a plurality of electronic apparatuses on a network connected to the information processing apparatus. The information processing method includes the steps of obtaining command definition information which defines the correspondence between a plurality of speech commands which are to be input by the user and a plurality of control commands for controlling the plurality of electronic apparatuses; storing the command definition information obtained in the command definition information obtaining step; recognizing a speech command input by the user; determining a control command corresponding to the speech command as recognized in the speech recognition step, based on the command definition information stored in the storing step; and controlling one of the plurality of electronic apparatuses using the control command determined in the determining step.

The present invention, in yet another aspect thereof, provides a computer-readable storage medium storing a computer program for controlling an information processing apparatus which controls, in accordance with speech commands input by the user, a plurality of electronic apparatuses on a network connected to the information processing apparatus. The computer program includes the steps of obtaining command definition information which defines the correspondence between a plurality of speech commands which are to be input by the user and a plurality of control commands for controlling the plurality of electronic apparatuses; storing the command definition information obtained in the command definition information obtaining step; recognizing a speech command input by the user; determining a control command corresponding to the speech command as recognized in the speech recognition step, based on the command definition information stored in the storing step; and controlling one of the plurality of electronic apparatuses using the control command determined in the determining step.

In accordance with the information processing apparatus, the information processing method, or the storage medium, the command definition information, defining the correspondence between a plurality of speech commands which are to be input by the user and a plurality of control commands for controlling the plurality of electronic apparatuses, is obtained and stored. A speech command input by the user is recognized, and a control command corresponding to the speech command as recognized is determined based on the command definition information. Then the control command is used to control one of the plurality of electronic apparatuses. Accordingly, the present invention allows a plurality of electronic apparatuses to be controlled in an integrated manner by a single speech recognition apparatus using an integrated user interface.

BRIEF DESCRIPTION OF THE DRAWINGS

FIG. 2 is a schematic diagram showing an example of command definition information;

DESCRIPTION OF THE PREFERRED EMBODIMENT

Figure 1:
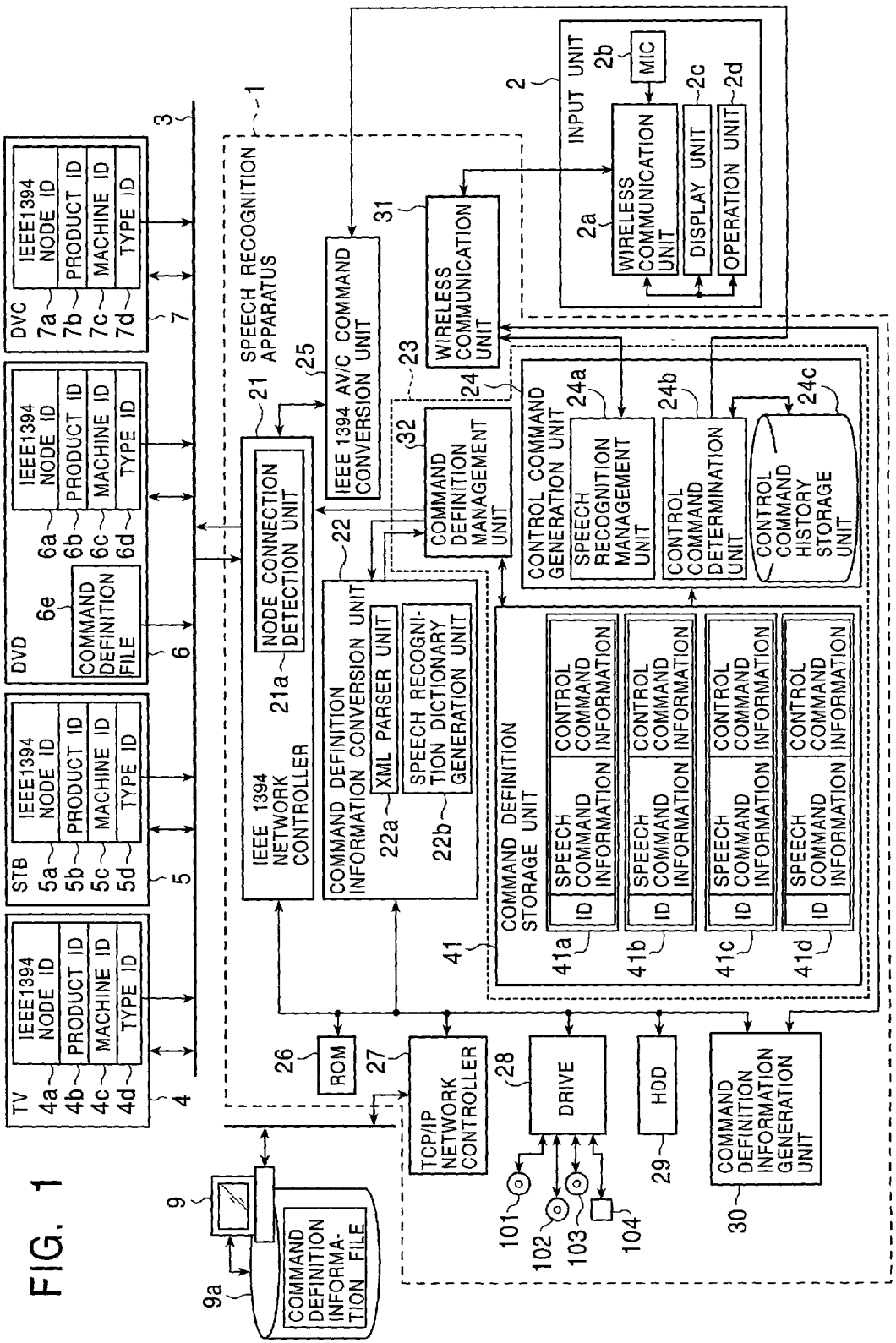
FIG. 1 is a block diagram of a speech recognition apparatus according to an embodiment of the present invention, shown as linked to an input unit and connected to a network.

FIG. 1 is a block diagram showing the configuration of a system incorporating a speech recognition apparatus 1 according to an embodiment of the present invention. As shown in FIG. 1, the speech recognition apparatus 1 is linked to an input unit 2, and is connected to an IEEE (Institute of Electrical and Electronic Engineers) 1394 network. The speech recognition apparatus 1 receives speech commands from the input unit 2, and accordingly controls each of the nodes on the IEEE 1394 network 3, i.e., a television receiver (TV) 4, a set-top box (STB) 5, a digital versatile disk drive (DVD) 6, and a digital video camera (DVC) 7. Each of the components of the speech recognition apparatus 1, the input unit 2, and the nodes on the IEEE 1394 network 3 will be described below with reference to FIG. 1.

An IEEE 1394 network controller 21 serves as an interface to the IEEE 1394 network 3, and exchanges data with the nodes on the IEEE 1394 network 3. The IEEE 1394 network controller 21 includes a node connection detection unit 21a. The node connection detection unit 21a detects ID information of the nodes on the IEEE 1394 network 3, including the IEEE 1394 node IDs thereof, and outputs the result to a speech recognition unit 23.

The speech recognition unit 23 includes a command definition management unit 32, a command definition storage unit 41, and a control command generation unit 24. The command definition management unit 32 is responsible for the overall management concerning the addition and deletion of command definitions. The command definition management unit 32 receives the ID information, including the node IDs, detected by and input from the node connection detection unit 21a, and thereby recognizes the connection status of the nodes on the IEEE 1394 network 3. Furthermore, the command definition management unit 32 instructs a command definition information conversion unit 22 to obtain command definition information, described in XML (eXtensible Markup Language), from various sources including the TV4, the STB 5, the DVD 6, and the DVC 7 on the IEEE 1394 network 3; a WWW (World Wide Web) server 9 on a TCP/IP network (i.e., the Internet) 8, with a TCP/IP network controller 27 as an interface; a magnetic disk 101, an optical disk 102, a magneto-optical disk 103, or a semiconductor memory device 104 set in a drive unit 28; a hard disk set in a hard disk drive (HDD) 26; a command definition information generation unit 30a; and a ROM (read-only memory) 26. At this time, the command definition management unit 32 also supplies the ID information supplied from the node connection detection unit 21a to the command definition information conversion unit 22. The command definition information describes, on the basis of operation states of the nodes, information which relates acceptable speech commands to corresponding control commands. The XML format of the command definition information will be described in more detail later herein.

The command definition information conversion unit 22 includes an XML parser unit 22a and a speech recognition dictionary generation unit 22b. The XML parser unit 22a interprets the XML-based command definition information supplied from the command definition management unit 32. The result of interpretation is output to the speech recognition dictionary generation unit 22b together with the ID information supplied from the command definition management unit 32. Based on the result of interpretation and the ID information supplied form the XML parser unit 22a, the speech recognition dictionary generation unit 22b generates speech recognition dictionaries 41a, 41b, 41c, and 41d respectively corresponding to the nodes on the IEEE 1394 network 3, and outputs the speech recognition dictionaries 41a, 41b, 41c, and 41d to the command definition management unit 32. The command definition management unit 32 then stores the speech recognition dictionaries 41a, 41b, 41c, and 41d in the command definition storage unit 41 of the speech recognition unit 23. The speech recognition dictionaries 41a, 41b, 41c, and 41d will be described in more detail later herein.

The command definition storage unit 41 of the speech recognition unit 23 is controlled by the command definition management unit 32, and stores the speech recognition dictionaries 41a, 41b, 41c, and 41d associated with the IEEE 1394 node IDs of the corresponding nodes, supplied from the speech recognition dictionary generation unit 22b.

The control command generation unit 24 includes a speech recognition management unit 24a, a control command determination unit 24b, and a control command history storage unit 24c. The speech recognition management unit 24a is responsible for the overall control of the control command generation unit 24. The speech recognition management unit 24a recognizes, with reference to the speech recognition dictionaries 41a, 41b, 41c, and 41d, a speech command input from the input unit 2, based on, for example, the hidden Markov model (HMM). If one of the nodes is specified as the target of the speech command, the speech recognition management unit 24a recognizes the speech command using only the corresponding one of the speech recognition dictionaries 41a, 41b, 41c, and 41d.

Based on the result of speech recognition, the speech recognition management unit 24a outputs candidates, for example, up to top ten candidates, of the control command corresponding to the speech command to the control command determination unit 24b. The arrangement may be such that the number of the candidate control commands output to the control command determination unit 24b is specified as desired.

The control command determination unit 24b compares, as required, the candidate commands input from the speech recognition management unit 24a with control command history information stored in the control command history storage unit 24c, thereby determining which control command corresponds to the speech command. The control command determination unit 24b then outputs the control command to an IEEE 1394 AV/C (audio, video, and control) command conversion unit 25.

The IEEE 1394 AV/C command conversion unit 25 converts the control command, input from the control command determination unit 24b, into an AV/C command, and outputs the AV/C command to the target node via the IEEE 1394 network controller 21 and the IEEE 1394 network 3.

The TCP/IP network controller 27 is controlled by the command definition information conversion unit 22 in accordance with instructions from the command definition management unit 32, and accordingly accesses the WWW server 9 via the TCP/IP network 8 to obtain command definition information stored in an HDD 9a of the WWW server 9.

The drive unit 28 is controlled by the command definition information conversion unit 22 in accordance with instructions from the command definition management unit 32, and accordingly retrieves command definition information stored in the magnetic disk 101, the optical disk 102, the magneto-optical disk 103, or the semiconductor memory device 104 which is set therein.

The HDD 29 is controlled by the command definition information conversion unit 22 in accordance with the instructions from the command definition management unit 32, and accordingly retrieves command definition information stored in the hard disk. The arrangement may be such that the magnetic disk 101, the optical disk 102, the magneto-optical disk 103, the semiconductor memory device 104, and the hard disk stores command definition information obtained by the command definition information conversion unit 22 via the IEEE 1394 network controller 21 or the TCP/IP network controller 27, so that the command definition information is retrieved as desired anytime afterwards.

The command definition information generation unit 30 is used when the command definition information is not available from the above sources and at the same time the user is allowed to generate command definition information. The command definition information generation unit 30 generates the command definition information based on user inputs from the input unit 2, and outputs the command definition information to the command definition information conversion unit 22.

The ROM 26 stores a database of XML-based basic command definition information which is common to all of the nodes on the IEEE 1394 network 3. The command definition management unit 32 instructs the command definition information conversion unit 22 to obtain the basic command definition information stored in the ROM 26 when command definition information is not available otherwise.

The wireless communication unit of the speech recognition apparatus 1 is used to receive signals from the input unit 2, and also to transmit information to the input unit 2 as required.

The input unit 2 includes a wireless communication unit 2a, a microphone 2b, a display unit 2c, and an operation unit 2d. The wireless communication unit 2a transmits signals in accordance with user inputs to the wireless communication unit 31 of the speech recognition apparatus 1. The microphone 2b receives various speech commands from the user. The display unit 2c displays an editor screen for generating command definition information. In addition, when the control command generation unit 24 fails to determine the target node internally, the display unit 2c displays candidates of the target node, transmitted from the wireless communication unit 31 of the speech recognition apparatus 1 and received by the wireless communication unit 2a. The operation unit 2d allows the user to generate command definition information based on the editor screen displayed on the display unit 2c, and to select the target node from the candidates displayed on the display unit 2c.

Each of the nodes on the IEEE 1394 network 3, i.e., the TV4, the STB 5, the DVD 6, and the DVC 7, includes, although not shown, a central processing unit (CPU), a storage unit (a hard disk, a memory device, etc.) in which ID information of the node is stored, and a communication unit for communications over the IEEE 1394 network 3. Each of the nodes, under the control of the CPU, transmits the ID information from the communication unit to the IEEE 1394 network controller 21 of the speech recognition apparatus 1 via the IEEE 1394 network 3.

The ID information includes the IEEE 1394 node ID (4a, 5a, 6a, or 7a), the product ID (4b, 5b, 6b, or 7b), the machine ID (4c, 5c, 6c, or 7c), and the type ID (4d, 5d, 6d or 7d) of the corresponding node.

The IEEE 1394 node ID identifies a node on the IEEE 1394 network 3, which is assigned each time the node is connected to the IEEE 1394 network 3, i.e., on each bus reset operation. The product ID uniquely identifies the node among various electronic equipment products, and includes, for example, information regarding the manufacturer, the type number, and the serial number. Although the IEEE 1394 node ID is primarily used for processing in this embodiment, if the speech recognition apparatus 1 is used to control nodes on other types of network, the product ID may alternatively be used for identification of the nodes. The machine ID indicates the machine type of the node, and includes, for example, information regarding the manufacturer, and the type number. The type ID indicates a broad classification of the product type of the node, such as a television receiver, a set-top box.

In this embodiment, of the nodes on the IEEE 1394 network 3, only the DVD 6 stores a command definition information file 6e on its own. The speech recognition apparatus 1 obtains the command definition information file 6e via the IEEE 1394 network 3, and controls the DVD 6 based thereon. With regard to the other nodes on the IEEE 1394 network 3, the speech recognition apparatus obtains appropriate command definition information based on the ID information, and controls the nodes accordingly.

Next, command definition information will be described in more detail. In its simplest form, command definition information defines, on the basis of operation status of the nodes on the IEEE 1394 network 3, acceptable speech commands, control commands corresponding to the speech commands, and transitions of operation status which occur on execution of each of the control commands.

Figure 3:
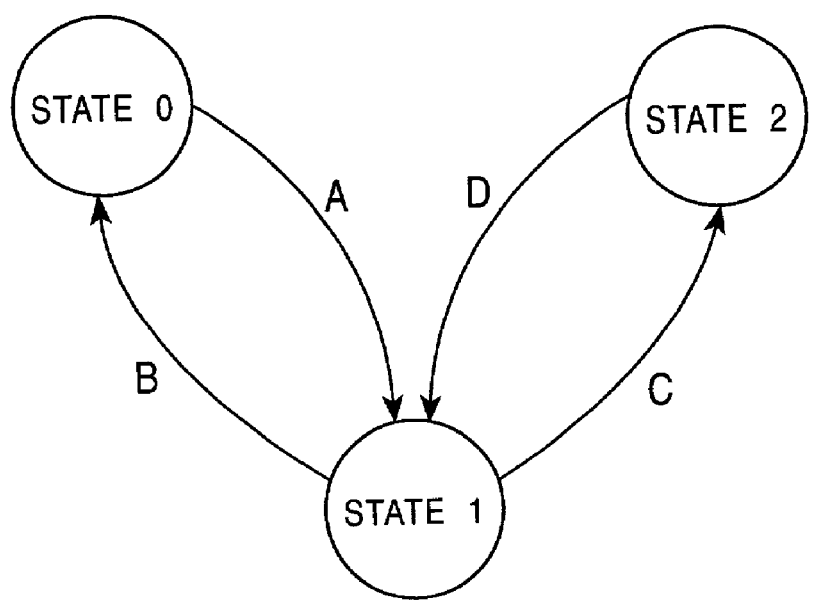
FIG. 3 is a schematic diagram showing an example of state transitions.

FIG. 2 is a schematic diagram showing an example of command definition information, which corresponds to the DVC 7. Referring to FIG. 2, when the DVC 7 is in State 0, acceptable speech commands are "power on" and "switch on". Both of the speech commands "power on" and "switch on" correspond to a control command "Power On". When the DVC 7 executes the control command "Power On", the DVC 7 exits State 0 and enters State 1. In FIG. 3, the state transition is indicated by the arrow A.

When the DVC 7 is in State 1, acceptable speech commands are "power off", "switch off", and "play". The speech commands "power off" and "switch off" correspond to a control command "Power Off". The speech command "play" corresponds to a control command "Play". When the DVC 7 executes the control command "Power Off", the DVC 7 exits State 1 and enters State 0, as indicated by the arrow B in FIG. 3. When the DVC 7 executes the control command "Play", the DVC 7 exits State 1 and enters State 0, as indicated by the arrow C in FIG. 3.

When the DVC 7 is in State 2, the only acceptable speech command is "stop". The speech command "stop" corresponds to a control command "Stop". When the DVC 7 executes the control command "Stop", the DVC 7 exits State 2 and enters State 1, as indicated by the arrow D in FIG. 3.

As described above, which commands are acceptable depends on the operation status of the nodes on the IEEE 1394 network 3. Thus, in speech recognition processing, the speech recognition management unit 24a assumes only the acceptable speech commands as effective based on the operation status of the nodes on the IEEE 1394 network 3.

Next, the XML-based format for describing the command definition information will be described. Given below is an example of XML-based command definition information, which corresponds to State 0, State 1, and State 2 shown in FIG. 2.

```
1   <COMMAND DEFINITION INFORMATION>
2   <CLASS>MACHINE</CLASS>
3   <ID>MDX-001</ID>
4   <DATE>1999/12/17</DATE>
5   <NUMBER OF STATES>3</NUMBER OF STATES>
6   <STATE NO. = 0>
7   <COMMAND>
8   <SPEECH COMMAND>power on</SPEECH COMMAND>
9   <SPEECH COMMAND>switch on</SPEECH COMMAND>
10  <CONTROL COMMAND>Power On</CONTROL COMMAND>
11  <TRANSITION>1</TRANSITION>
12  </COMMAND>
13  </STATE>
14  <STATE NO. = 1>
15  <COMMAND>
16  <SPEECH COMMAND>power off</SPEECH COMMAND>
17  <SPEECH COMMAND>switch off</SPEECH COMMAND>
18  <CONTROL COMMAND>Power Off</CONTROL COMMAND>
19  <TRANSITION>0</TRANSITION>
20  </COMMAND>
21  <COMMAND>
22  <SPEECH COMMAND>play</SPEECH COMMAND>
23  <CONTROL COMMAND>Play</CONTROL COMMAND>
24  <TRANSITION>2</TRANSITION>
25  </COMMAND>
26  </STATE>
27  <STATE NO. = 2>
28  <COMMAND>
29  <SPEECH COMMAND>stop</SPEECH COMMAND>
30  <CONTROL COMMAND>Stop</CONTROL COMMAND>
31  <TRANSITION>1</TRANSITION>
32  </COMMAND>
33  </STATE>
34  </COMMAND DEFINITION INFORMATION>
```

As shown above, XML uses sets of tags <\*\*\*> and </\*\*\*> to enclose corresponding contents. For example, referring to line 3, "MDX-001" is enclosed in the set of tags <ID> and </ID>, which indicate that MDX-001 is an ID. Interpretation of each of the lines is given below.

line 1 indicates that the following lines describe command definition information. line 2 indicates that the command definition information will be defined based on machine ID. line 3 indicates that the command definition information corresponds to the machine ID "MDX-001". Line 4 indicates that the command definition information was generated on Dec. 17, 1999. line 5 indicates that the number of states which are involved in the command definition information being described is three, corresponding to State 0, State 1, and State 2.

Line 6 indicates that the subsequent description concerns State 0. Line 7 indicates the start of a description of commands. Line 8 indicates that a speech command "power on" is acceptable in State 0. Similarly, line 9 indicates that a speech command "switch on" is acceptable in State 0. Line 10 indicates that the speech commands "power on" and "switch on" on lines 8 and 9, respectively, correspond to a control command "Power On". Line 11 indicates that when the control command "Power On" is executed, a state transition occurs from State 0 to State 1. Line 12 indicates the end of the description of commands, which started on line 7. Line 13 indicates the end of description concerning State 0, which started on line 6.

Line 14 indicates that the description will now be directed to State 1. Line 15 indicates the start of a description of commands. Line 16 and line 17 indicate that speech commands "power off" and "switch off"are acceptable in State 1, respectively. Line 18 indicates that both of the speech commands "power off" and "switch off" correspond to a control command "Power Off". Line 19 indicates that when the control command "Power Off" is executed, a state transition occurs from State 1 to State 0. Line 20 indicates the end of the description of commands, which started on line 15. Line 21 indicates the start of a description of commands. Line 22 indicates that a speech command "play" is acceptable in State 1. Line 23 indicates that the speech command "play" corresponds to a control command "Play". Line 24 indicates that when the control command "Play" is executed, a state transition occurs from State 1 to State 2. Line 25 indicates the end of the description of commands, which started on line 21. Line 26 indicates the end of description directed to State 1, which started on line 14.

Line 27 indicates that the description will now turn to State 2. Line 28 indicates the start of a description of commands. Line 29 indicates that a speech command "stop" is acceptable in State 2. Line 30 indicates that the speech command "stop" corresponds to a control command "Stop". Line 31 indicates that when the control command "Stop" is executed, a state transition occurs from State 2 to State 1. Line 32 indicates the end of the description of commands, which started on line 28. Line 33 indicates the end of the description regarding State 2, which started on line 27.

Line 34 indicates the end of the description of the command definition information, which started on line 1.

The command definition information described as above is analyzed by the XML parser unit 22a, and the result is output to the speech recognition dictionary generation unit 22b. Based thereon, the speech recognition dictionary generation unit 22b generates the speech recognition dictionaries 41a, 41b, 41c, and 41d corresponding to each of the nodes on the IEEE 1394 network 3. The speech recognition dictionaries 41a, 41b, 41c, and 41d are then stored in the command definition storage unit 41.

Next, the speech recognition dictionaries 41a, 41b, 41c, and 41d will be described in more detail. The speech recognition dictionaries 41a, 41b, 41c, and 41d are generated by converting the corresponding command definition information into a predetermined format which includes speech command information and control command information. The speech recognition management unit 24a is thus allowed to recognize speech commands based on the speech recognition dictionaries 41a, 41b, 41c, and 41d, corresponding to the TV 4, the STB 5, the DVD 6, and the DVC 7, respectively.

Figure 4:
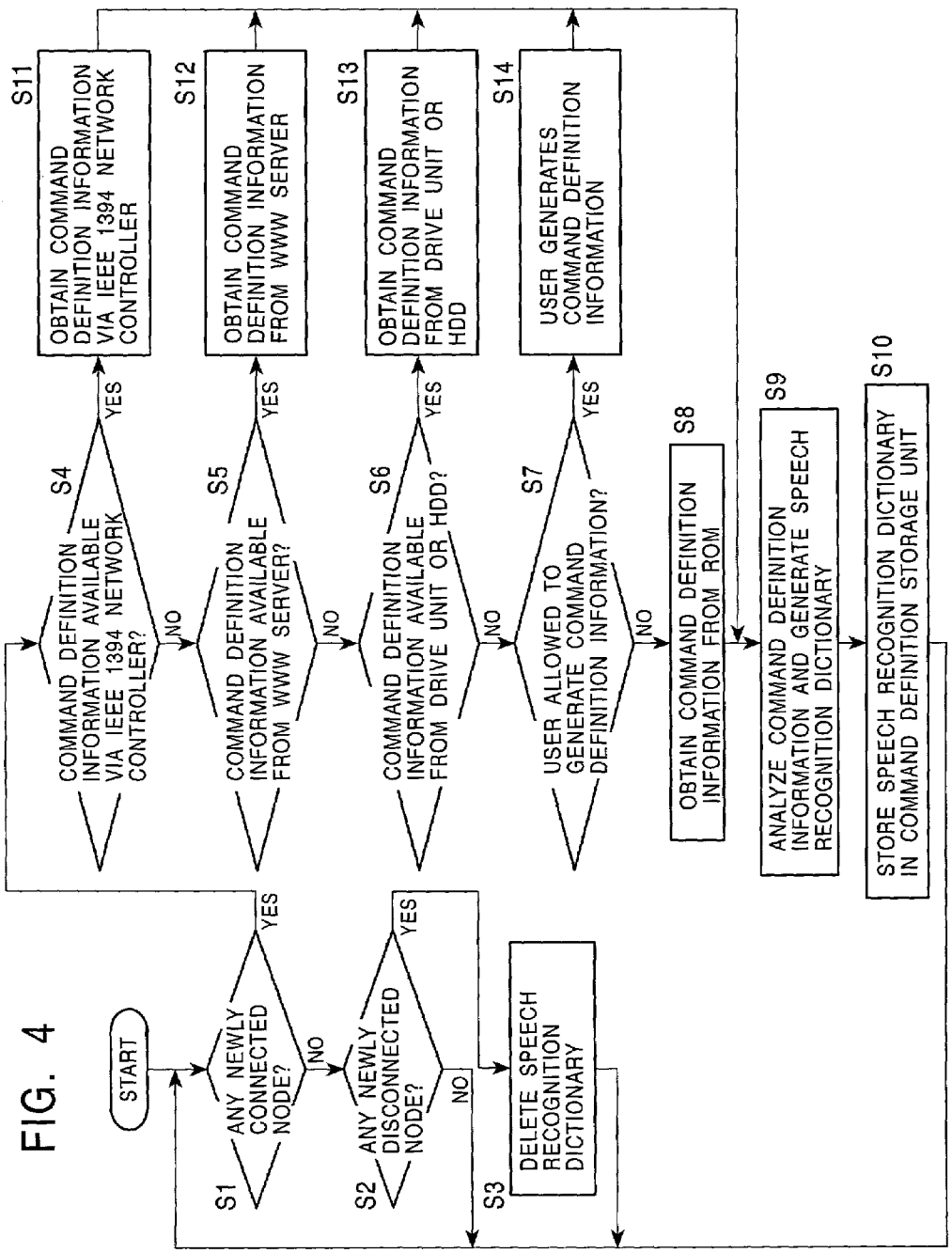
FIG. 4 is a flowchart of a processing for generating speech recognition dictionaries.

Next, with reference to the flowchart shown in FIG. 4, description will be made to a processing in the speech recognition apparatus 1 for generating speech recognition dictionaries corresponding to the nodes on the IEEE 1394 network 3.

First, in step S1, the command definition management unit 32 generates a query to the node connection detection unit 21a of the IEEE 1394 network controller 21 to determine whether any node is newly connected to the IEEE 1394 network 3. If it is found that there is no newly connected node, the processing proceeds to step S2.

In step S2, the command definition management unit 32 generates a query to the node connection detection unit 21a whether any node is disconnected. If it is found that there is no disconnected node, the processing returns to step S1. If it is found that there is any disconnected node, the processing proceeds to step S3.

In step S3, the command definition management unit 32 receives the product ID of the disconnected node, and based thereon, deletes from the command definition storage unit 41 (or set a disable flag for) the speech recognition dictionary corresponding to the disconnected node. The processing then returns to step S1.

If it is found that there is any newly connected node, the processing proceeds to step S4. In step S4, the command definition management unit 32 determines whether command definition information corresponding to the node is available via the IEEE 1394 network controller 21. If it is found that the command definition information is available via the IEEE 1394 network controller 21, for example, when the DVD 6 having the command definition information file 6e is newly connected, the processing proceeds to step S11.

In step S11, the command definition management unit 32 obtains the command definition information via the IEEE 1394 network controller 21, and outputs the command definition information to the XML parser unit 22a. Then, the processing proceeds to step S9.

If it is found in step 4 that the command definition information is not available via the IEEE 1394 network controller 21, the processing proceeds to step S5. In step 5, the command definition management unit 32 determines whether the command definition information is available from the WWW server 9 on the TCP/IP network 8 via the TCP/IP network controller 27. If it is found that the command definition information is available from the WWW server 9, the processing proceeds to step S12.

In step S12, the command definition management unit 32 accesses the WWW server 9 via the TCP/IP network controller 27 and the TCP/IP network 8 to thereby obtain the command definition information stored in the HDD 9a of the WWW server 9, and outputs the command definition information to the XML parser unit 22a. Then, the processing proceeds to step S9.

If it is found in step 5 that the command definition information is not available from the WWW server 9, the processing proceeds to step S6. In step S6, the command definition management unit 32 determines whether the command definition information is available from the drive unit 28 or the HDD 29. If it is found that the command definition information is available from the drive unit 28 or the HDD 29, the processing proceeds to step S13.

In step S13, the command definition management unit 32 accesses the magnetic disk 101, the optical disk 102, the magneto-optical disk 103, or the semiconductor memory set in the drive unit 28, or the HDD 29, to thereby obtain the command definition information, and outputs the command definition information to the XML parser unit 22*a*. Then, the processing proceeds to step S9.

If it is found in step 6 that the command definition information is not available from the drive unit 28 or the HDD 29, the processing proceeds to step S7. In step S7, the command definition management unit 32 determines whether the user is allowed to generate command definition information. If it is found that the user is allowed to generate command definition information, the processing proceeds to step S14.

In step S14, the command definition management unit 32, controls the command definition information generation unit 30 so that the user is prompted to generate command definition information using the input unit 2. The user accordingly generates command definition information. The command definition information is transmitted from the wireless communication unit 2*a* of the input unit 2, received by the wireless communication unit 31 of the speech recognition apparatus 1, and then forwarded to the command definition management unit 32 via the command definition information generation unit 30. The command definition management unit 32 outputs the command definition information to the XML parser unit 22*a*. Then, the processing proceeds to step S9. Generation of command definition information by the user will be described in more detail later herein.

If it is found in step 7 that the user is not allowed to generate command definition information, the processing proceeds to step S8. In step S8, the command definition management unit 32 accesses the ROM 26 to thereby obtains the basic command definition information stored therein, and outputs the basic command definition information to the XML parser unit 22*a*. Then, the processing proceeds to step S9.

In step S9, the XML parser unit 22*a* analyzes the command definition information, obtained in step S11, step S12, step S13, step S14, or step S8 as the case may be, and outputs the result to the speech recognition dictionary generation unit 22*b*. The speech recognition dictionary generation unit 22*b* generates a corresponding speech recognition dictionary, and outputs the speech recognition dictionary, together with the IEEE 1394 node ID, to the command definition management unit 32. In step 10, the command definition management unit 32 stores the speech recognition dictionary in the command definition storage unit 41. Then, the processing returns to step S1, and the processing as described above is repeated.

Figure 5:
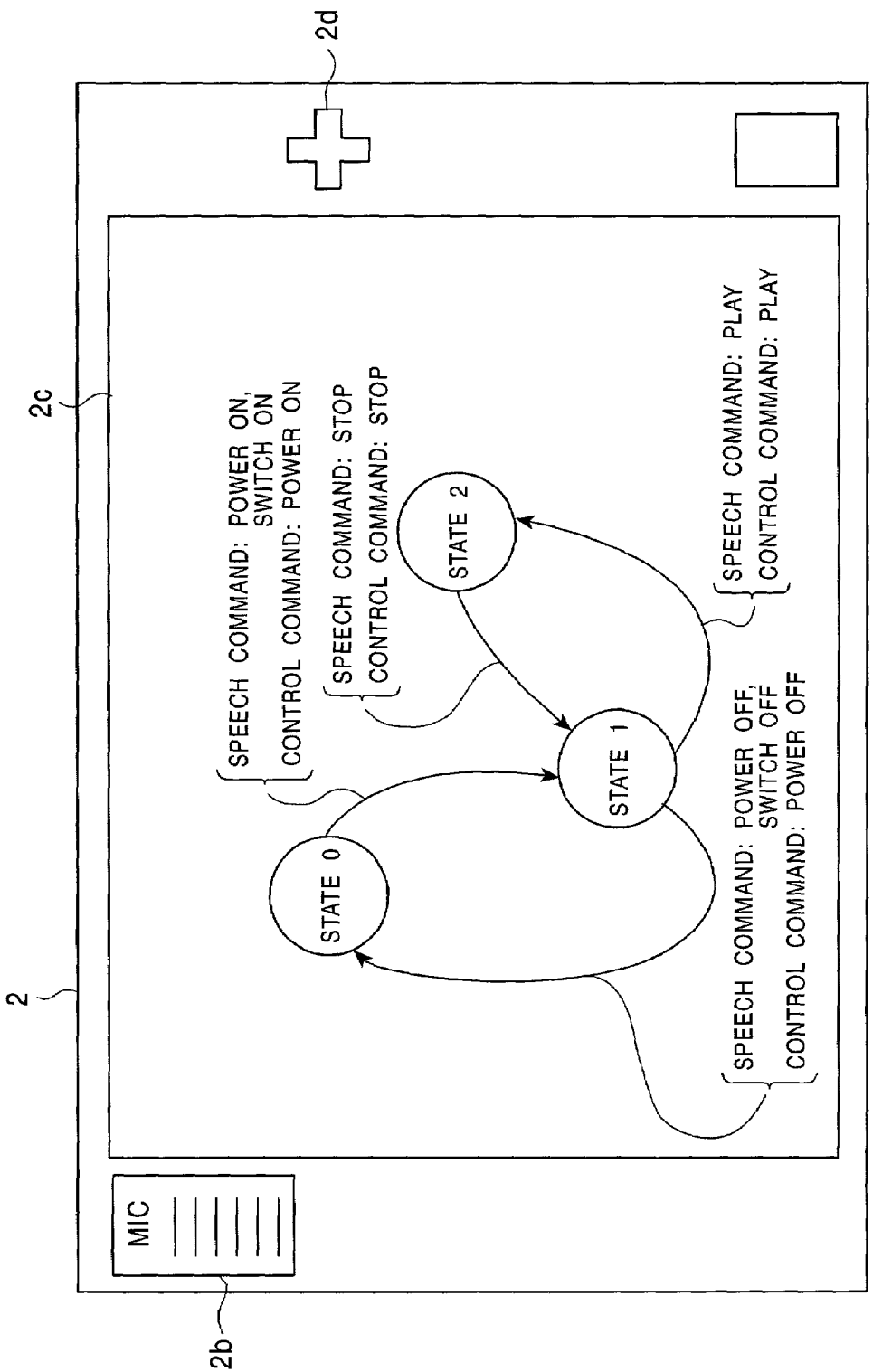
FIG. 5 is an illustration of an example of an editor screen which allows the user to generate command definition information.

Next, generation of command definition information by the user will be described in more detail. FIG. 5 is an illustration of an example of the editor screen displayed on the display unit 2*c* of the input unit 2. The editor screen allows the user to generate command definition information by defining, on the basis of operation status of the nodes on the IEEE 1394 network 3, acceptable speech commands, control commands corresponding to the speech commands, and state transitions which occur on execution of each of the control commands.

Referring to FIG. 5, transitions among the states are indicated by arrows among the states. Beside the arrows are acceptable speech commands and corresponding control commands. In this example, acceptable speech commands in State 0 are "power on" and "switch on". Both of the speech commands "power on" and "switch on" correspond to the control command "Power On". When the control command "Power On" is executed, a state transition occurs from State 0 to State 1.

In State 1, acceptable speech commands are "power off", "switch off", and "play". The speech commands "power off" and "switch off" corresponds to the control command "Power Off", and the speech command "play" corresponds to the control command "Play". When the control command "Power Off" is executed, a state transition occurs from State 1 to State 0. When the control command "Play" is executed, a state transition occurs from State 1 to State 2.

In State 2, the only acceptable speech command is "stop". The speech command "stop" corresponds to the control command "Stop". When the control command "Stop" is executed, a state transition occurs from State 2 to State 1.

The command definition information generated by the user is transmitted from the input unit 2 via the wireless communication unit 2*a*, and is received by the command definition information generation unit 30 via the wireless communication unit 31 of the speech recognition apparatus 1. The command definition information is then forwarded to the command definition management unit 32.

Figure 6:
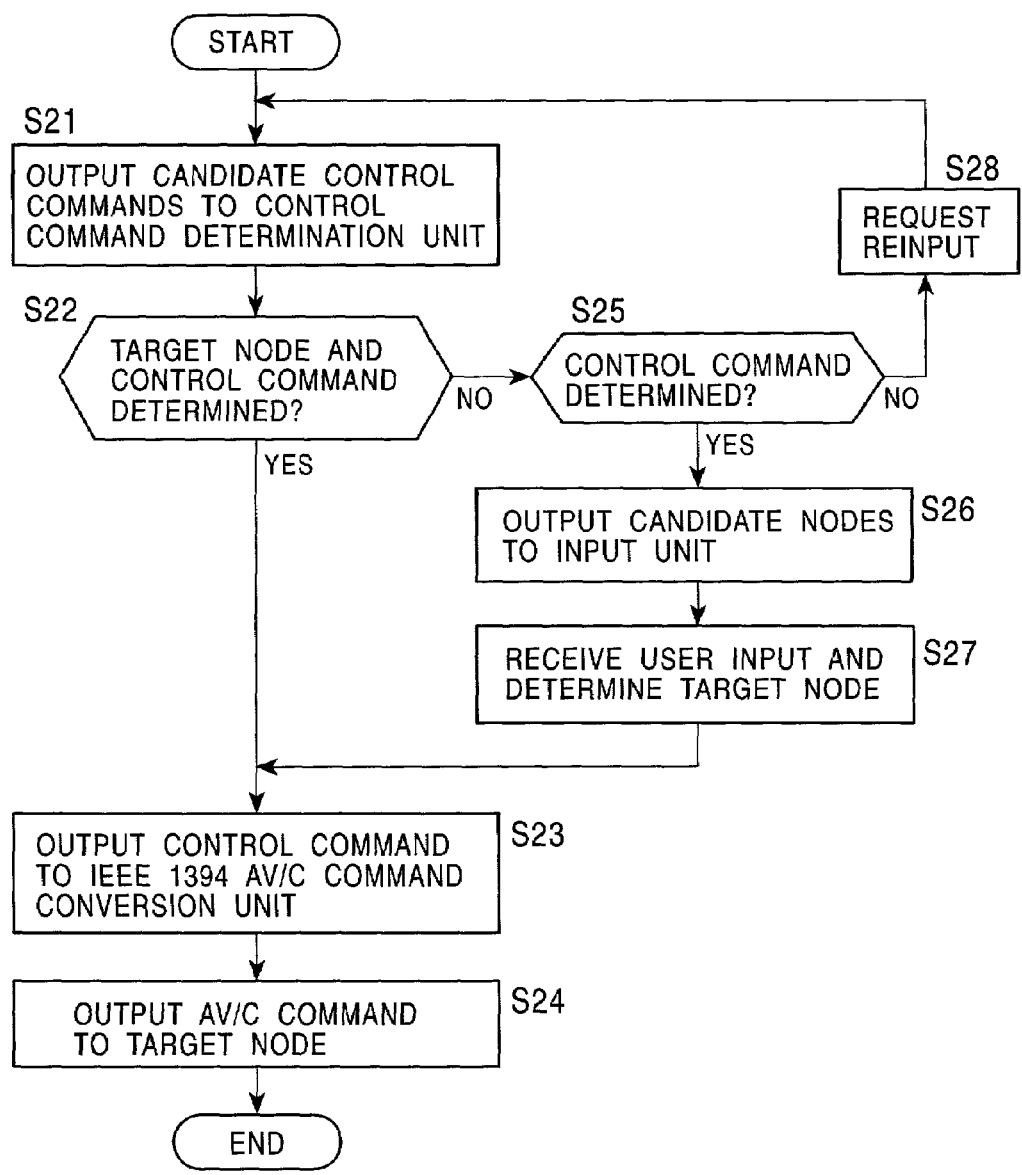
FIG. 6 is a flowchart of a processing for generating a control command corresponding to a speech command input by the user.

Next, with reference to the flowchart shown in FIG. 6, description will be made to a processing for generating a control command corresponding to a speech command input by the user. In the following description, it is to be assumed that the speech recognition dictionaries 41*a*, 41*b*, 41*c*, and 41*d* corresponding to the nodes on the IEEE 1394 network 3 are already stored in the command definition storage unit 41 by the processing shown in the flowchart of FIG. 4.

The processing starts when the user inputs a speech command to the MIC 2*b* of the input unit 2. First, in step S21, the speech recognition management unit 24*a* recognizes the speech command received via the wireless communication unit 31 with reference to the speech recognition dictionaries 41*a*, 41*b*, 41*c*, and 41*d* stored in the command definition storage unit 41, and outputs candidate control commands to the control command determination unit 24*b*.

In step S22, the control command determination unit 24*b* determines whether a target node and a control command have been determined. If it is found that the target node and the control command have already been determined, the processing proceeds to step S23. If it is found that the target node and the control command have not been determined yet, the processing proceeds to step S25.

In step S25, the control command determination unit 24*b* further determines whether the control command has been determined. If it is found that the control command has been determined, i.e., when the speech command has failed to be recognized, the processing proceeds to step S28.

In step S28, the speech recognition management unit 24*a* outputs a request for reinput to the input unit 2 and displays a corresponding message on the display unit 2*c*. When the user inputs a speech command again, the processing returns to step S21, and the processing as described above is repeated.

Figure 7:
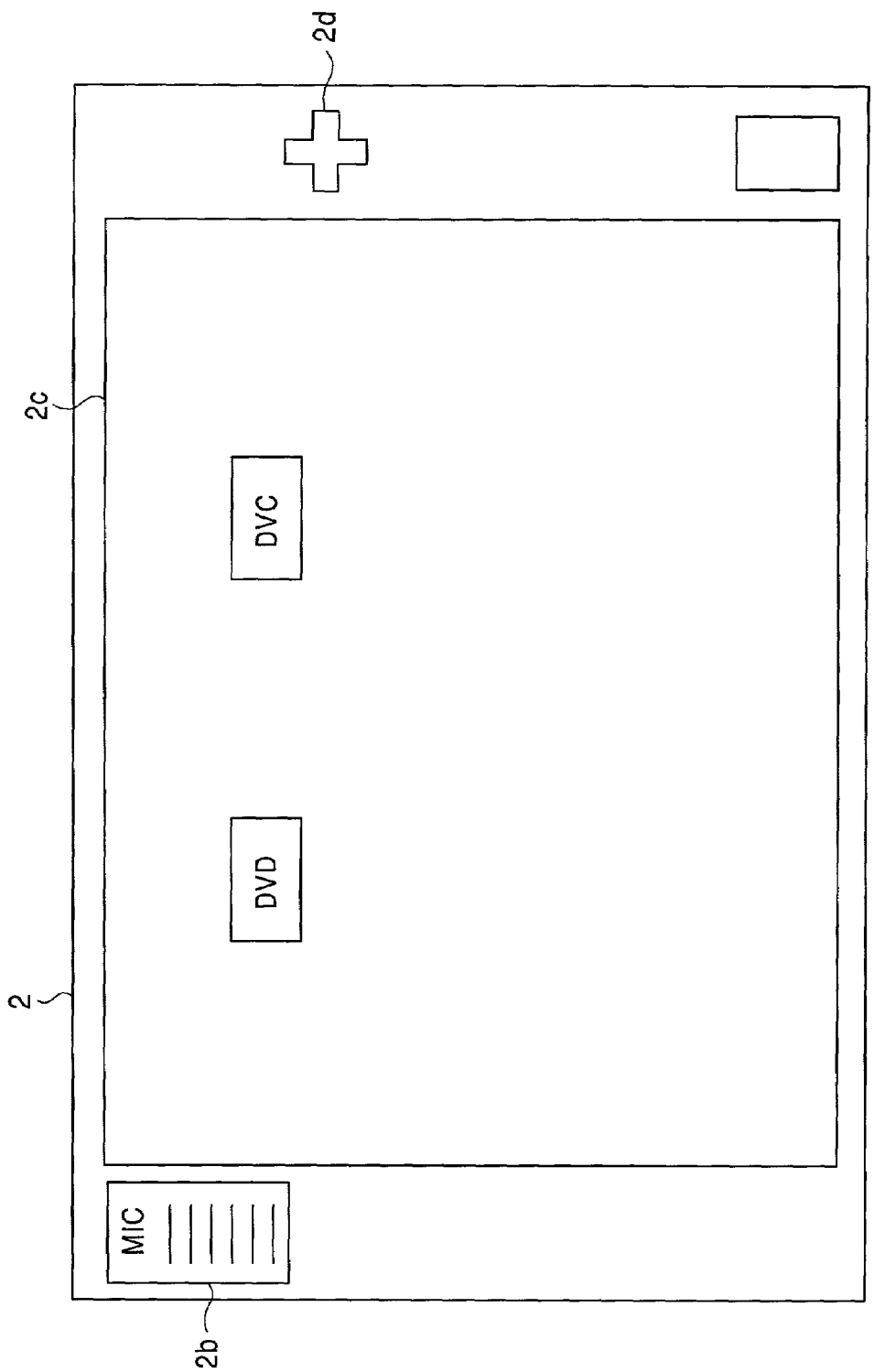
FIG. 7 is an illustration of an example of a screen which allows the user to select a target node from candidate nodes.

If it is found in step S25 that the control command has been determined, i.e., when the target node has not been determined, the processing proceeds to step S26. In step S26, the control command determination unit 24b notifies the speech recognition management unit 24a to that effect, and the speech recognition management unit 24a then outputs the candidate nodes to the input unit 2 via the wireless communication unit 31. In the input unit 2, the candidate nodes are received via the wireless communication unit 2a and then displayed on the display unit 2c. FIG. 7 is an illustration of an example of the screen displayed on the display unit 2c when the DVD 6 and the DVC 7 are selected as candidate nodes. The user operates on the operation unit 2d to select one of the candidate nodes displayed on the display unit 2c. The operation unit 2d may be implemented, for example, by the type of button as shown in FIG. 7, or a tablet-like button. Alternatively, the display unit 2c may be implemented as a touch panel so that the user is allowed to operate thereon.

In step S27, the speech recognition management unit 24a receives the user input and forwards to the control command determination unit 24b, and the control command determination unit 24b determines the target node accordingly. Then, the processing proceeds to step S23.

Alternatively, when it is found in step S25 that the control command has been determined, the control command determination unit 24b may designate, with reference to the control command history storage unit 24c, the most recently operated node as the target node.

In step S23, the control command determination unit 24b outputs the control command to the IEEE 1394 AV/C command conversion unit 25.

In step S24, the IEEE 1394 AV/C command conversion unit 25 converts the control command into an AV/C command, and outputs the AV/C command to the target node via the IEEE 1394 network 3.

Although in the above-described embodiment, the IEEE 1394 AV/C command conversion unit 25 only generates and outputs AV/C commands, in addition, the IEEE 1394 AV/C command conversion unit 25 may receive AV/C responses, indicating completion of operation, from the nodes on the IEEE 1394 network 3 and output to the speech recognition management unit 24a.

It is to be appreciated that the type of network on which electronic apparatuses to be controlled by the speech recognition apparatus 1 may be different from the IEEE 1394 network 3 as in the embodiment. Even if a different type of network is used, the electronic apparatuses on the network can be identified using the product ID or the corresponding network ID instead of the IEEE 1394 node ID.

Furthermore, although the embodiment has been described in the context that the various IDs are assigned to the electronic apparatuses in advance, alternatively, the arrangement may be such that the command definition management unit 32 assigns an ID to each newly connected electronic apparatus. The above-described processing can be applied to an electronic apparatus which does not have any product ID, machine ID, nor type ID, if the user generates command definition information for the electronic apparatus and the command definition management unit 32 assigns an ID to the electronic apparatus.

The command definition storage unit 41 may be provided with a cache memory in which deleted speech recognition dictionaries are temporarily stored as required, so that when one of the deleted speech recognition dictionaries is again needed, the speech recognition dictionary can be quickly retrieved from the cache memory instead of newly generating the speech recognition dictionary.

The processing as described above may be implemented either in hardware or in software. In the latter case, a program for implementing the processing is stored in a storage medium and installed on a dedicated computer incorporating special hardware, or on a general-purpose personal computer capable of executing various functions.

Examples of the storage medium include a hard disk, incorporated in the speech recognition apparatus 1 in advance, and package media which are separately distributed to provide the user with the program which is to be installed on the speech recognition apparatus 1, including a magnetic disk such as a floppy disk, an optical disk such as a CD-ROM (compact disk read-only memory) and a DVD (digital versatile disk), a magneto-optical disk such as a mini-disk (MD), and a semiconductor memory 104, for example, a memory stick.

It is to be appreciated that the processing as described above need not be executed serially in the described order, and may be executed in parallel or individually.

What is claimed is:

1. An information processing apparatus for controlling, in accordance with a plurality of speech commands input by a user, a plurality of electronic apparatuses on a network connected to said information processing apparatus, said information processing apparatus comprising:

command definition information obtaining means for obtaining command definition information which defines a correspondence between the plurality of speech commands input by the user and a plurality of control commands for controlling said plurality of electronic apparatuses;

storage means for storing said command definition information obtained by said command definition information obtaining means;

speech recognition means for recognizing a speech command input by the user;

determining means for determining a control command corresponding to the speech command as recognized by said speech recognition means, based on said command definition information stored in said storage means;

control means for controlling one of said plurality of electronic apparatuses using the control command determined by said determining means; and ID information obtaining means for obtaining ID information of said plurality of electronic apparatuses, wherein said command definition information obtaining means obtains said command definition information based on the ID information of said plurality of electronic apparatuses obtained by said ID information obtaining means, wherein said command definition information obtaining means obtains said command definition information based on the node ID, the product ID, the machine ID, or the type ID, in that order of priority, included in the ID information of said plurality of electronic apparatuses obtained by said ID information obtaining means, wherein when one or more new electronic apparatuses are connected to said network, new command definition information associated with said one or more new electronic apparatuses is added to said storage means; and wherein when one or more of said plurality of electronic apparatuses are disconnected from said network, previously stored command definition information is temporarily stored in said storage means for a predetermined period of time.

2. The information processing apparatus according to claim 1, wherein said command definition information is associated with the ID information of said plurality of electronic apparatuses.

3. The information processing apparatus according to claim 1, wherein said command definition information defines, on the basis of operation status of said plurality of electronic apparatuses, acceptable speech commands, control commands corresponding to the speech commands, and transitions of operation status which occur on execution of each of the control commands.

4. The information processing apparatus according to claim 3, wherein said determining means comprises operation status detecting means for detecting the operation status of said plurality of electronic apparatuses, whereby said determining means determines, in accordance with the operation status of said plurality of electronic apparatuses detected by said operation status detecting means, the control command corresponding to the speech command as recognized by said speech recognition means, based on said command definition information.

5. The information processing apparatus according to claim 1, wherein said command definition information obtaining means obtains said command definition information from a server on the Internet or from a storage medium.

6. The information processing apparatus according to claim 1, wherein said ID information includes at least one of a node ID, a product ID, a machine ID, or a type ID.

7. The information processing apparatus according to claim 1, further comprising connection status detecting means for detecting the connection status of said plurality of electronic apparatuses.

8. The information processing apparatus according to claim 1, further comprising selecting means tot allowing the user to select one of said plurality of electronic apparatuses,
wherein said determining means is allowed to determine the control command corresponding to the speech command as recognized by said speech recognition means, based on only part of said command definition information corresponding to the electronic apparatus selected by said selecting means.

9. The information processing apparatus according to claim 1, further comprising control command history storage means for storing history information regarding the control command determined by said determining means,
wherein an electronic apparatus in accordance with a user input or an electronic apparatus which is found to be most recently operated according to the history information stored in said control command history storage means is controlled using the control command, if it is not otherwise determined which of said plurality of electronic apparatuses be controlled using the control command.

10. The information processing apparatus according to claim 1, further comprising command definition information generation means for generating command definition information as desired,
wherein said command definition information obtaining means is allowed to obtain said command definition information from said command definition information generation means.

11. An information processing method in an information processing apparatus for controlling, in accordance with a plurality of speech commands input by a user, a plurality of electronic apparatuses on a network connected to said information processing apparatus, said information processing method comprising the steps of:

obtaining command definition information which defines a correspondence between the plurality of speech commands Input by the user and a plurality of control commands for controlling said plurality of electronic apparatuses;

storing said command definition information obtained in the command definition information obtaining step in a storage means;

recognizing a speech command input by the user;

determining a control command corresponding to the speech command as recognized in the speech recognition step, based on said command definition information stored in said storing step;

controlling one of said plurality of electronic apparatuses using the control command determined in the determining step; and obtaining ID information of said plurality of electronic apparatuses;

wherein said command definition information obtaining step obtains said command definition information based on the ID information of said plurality of electronic apparatuses obtained by said ID information obtaining step;

wherein said command definition information obtaining step obtains said command definition information based on the node ID, the product ID, the machine ID, or the type ID, in that order of priority, included in the ID information of said plurality of electronic apparatuses obtained by said ID information obtaining step;

wherein when one or more new electronic apparatuses are connected to said network, new command definition information associated with said one or more new electronic apparatuses is added to said storage means; and wherein when one or more of said plurality of electronic apparatuses are disconnected from said network, previously stored command definition information is temporarily stored in said storage means for a predetermined period of time.

12. The information processing method according to claim 11, wherein said command definition information is associated with the ID information of said plurality of electronic apparatuses.

13. The information processing method according to claim 11, wherein said command definition information defines, on the basis of operation status of said plurality of electronic apparatuses, acceptable speech commands, control commands corresponding to the speech commands, and transitions of operation status which occur on execution of each of the control commands.

14. The information processing method according to claim 13, wherein said determining step comprises an operation status detecting step for detecting the operation status of said plurality of electronic apparatuses, whereby said determining step determines, in accordance with the operation status of said plurality of electronic apparatuses detected by said operation status detecting step, the control command corresponding to the speech command as recognized by said speech recognition step, based on said command definition information.

15. The information processing method according to claim 11, wherein said command definition information obtaining step obtains said command definition information from a server on the Internet or from a storage medium.

16. The information processing method according to claim 11, wherein said ID information includes at least one of a node ID, a product ID, a machine ID, or a type ID.

17. The information processing method according to claim 11, further comprising a connection status detecting step for detecting the connection status of said plurality of electronic apparatus.

18. The information processing method according to claim 13, further comprising a selecting step for allowing the user to select one of said plurality of electronic apparatuses, wherein said determining steps is allowed to determine the control command corresponding to the speech command as recognized by said speech recognition step, based on only part of said command definition information corresponding to the electronic apparatus selected by said selecting step.

19. The information processing method according to claim 11, further comprising a control command history storage step for storing history information regarding the control command determined by said determining step, wherein an electronic apparatus in accordance with a user input or an electronic apparatus which is found to be most recently operated according to the history information stored in said control command history storage step is controlled using the control command, if it is not otherwise determined which of said plurality of electronic apparatuses be controlled using the control command.

20. The information processing method according to claim 11, further comprising a command definition information generation step for generating command definition information as desired, wherein said command definition information obtaining step is allowed to obtain said command definition information from said command definition information generation step.

21. A computer-readable storage medium storing a computer program for controlling an information processing apparatus which controls, in accordance with a plurality of speech commands input by a user, a plurality of electronic apparatuses on a network connected to said information processing apparatus, said computer program comprising the steps of:

obtaining command definition information which defines a correspondence between the plurality of speech commands input by the user and a plurality of control commands for controlling said plurality of electronic apparatuses;

storing said command definition information obtained in the command definition information obtaining step in a storage means;

recognizing a speech input by the user;

determining a control command corresponding to the speech command as recognized in the speech recognition step, based on said command definition information stored in the storing step;

controlling one of said plurality of electronic apparatuses using the control command determined in the determining step; and obtaining ID information of said plurality of electronic apparatuses, wherein said command definition information obtaining step obtains said command definition information based on the ID information of said plurality of electronic apparatuses obtained by said ID information obtaining step;

wherein said command definition information obtained step obtains said command definition information based on the node ID, the product ID, the machine ID, or the type ID, in that order of priority, included in the ID information of said plurality of electronic apparatuses obtained by said ID information obtaining step;

wherein when one or more new electronic apparatuses are connected to said network, new command definition information associated with said one or more new electronic apparatuses is added to said storage means; and wherein when one or more of said plurality of electronic apparatuses are disconnected from said network, previously stored command definition information is temporarily stored in said storage means for a predetermined period of time.

* * * * *